US010470101B2

(12) United States Patent
Furuta et al.

(10) Patent No.: US 10,470,101 B2
(45) Date of Patent: Nov. 5, 2019

(54) WIRELESS COMMUNICATION SYSTEM AND WIRELESS COMMUNICATION DEVICE

(71) Applicant: SEIKO EPSON CORPORATION, Tokyo (JP)

(72) Inventors: Yasuhiro Furuta, Nagano (JP); Hironobu Yamamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 64 days.

(21) Appl. No.: 15/598,511

(22) Filed: May 18, 2017

(65) Prior Publication Data
US 2018/0014242 A1    Jan. 11, 2018

(30) Foreign Application Priority Data
Jul. 6, 2016   (JP) .................. 2016-134414

(51) Int. Cl.
| | | |
|---|---|---|
| *H04B 7/14* | (2006.01) | |
| *H04W 40/22* | (2009.01) | |
| *H04W 48/14* | (2009.01) | |
| *H04W 48/20* | (2009.01) | |
| *H04W 84/12* | (2009.01) | |
| *H04W 88/04* | (2009.01) | |
| *H04W 48/10* | (2009.01) | |

(52) U.S. Cl.
CPC ........... *H04W 40/22* (2013.01); *H04W 48/14* (2013.01); *H04W 48/20* (2013.01); *H04W 48/10* (2013.01); *H04W 84/12* (2013.01); *H04W 88/04* (2013.01)

(58) Field of Classification Search
CPC ..... H04W 40/22; H04W 48/20; H04W 48/14; H04W 84/12; H04W 88/04; H04W 48/10

USPC ......................................................... 370/315
See application file for complete search history.

(56) References Cited

U.S. PATENT DOCUMENTS

| 2003/0100335 A1 | 5/2003 | Gassho et al. |
|---|---|---|
| 2005/0054342 A1 | 3/2005 | Otsuka |

(Continued)

FOREIGN PATENT DOCUMENTS

| JP | 2007-221808 A | 8/2007 |
|---|---|---|
| JP | 2013-219430 A | 10/2013 |

(Continued)

OTHER PUBLICATIONS

Dan Rowinski; "How Wi-Fi Direct Works As a Gateway to the Internet of Things"; Sep. 10, 2013; XP 055187004 https://readwrite.com/2013/09/10/what-is-wi-fi-direct/.

(Continued)

*Primary Examiner* — Chuong T Ho

(57) ABSTRACT

A wireless communication system includes a first wireless communication device supporting a first wireless connection or a second wireless connection, and a second wireless communication device operating as an access point identified by network identification information including first identification information for use in the first wireless connection and second identification information for use in the second wireless connection, and the first wireless communication device is wirelessly connected to the second wireless communication device on the basis of the first identification information or the second identification information, both of which are included in the network identification information.

10 Claims, 3 Drawing Sheets

(56) References Cited

U.S. PATENT DOCUMENTS

| | | | |
|---|---|---|---|
| 2010/0074236 A1* | 3/2010 | Takeda | H04W 24/04 370/338 |
| 2011/0307610 A1* | 12/2011 | Hayashi | H04W 12/06 709/225 |
| 2013/0053014 A1 | 2/2013 | Sung | |
| 2013/0184000 A1 | 7/2013 | Cook et al. | |
| 2013/0265935 A1 | 10/2013 | Matsuda | |
| 2014/0181943 A1* | 6/2014 | Arashin | H04W 12/06 726/7 |
| 2014/0247711 A1* | 9/2014 | Gantman | H04W 88/06 370/221 |
| 2015/0220290 A1 | 8/2015 | Park et al. | |
| 2015/0230165 A1* | 8/2015 | Aminaka | H04W 48/18 455/552.1 |
| 2016/0088190 A1* | 3/2016 | Saito | H04N 1/4433 358/1.13 |

FOREIGN PATENT DOCUMENTS

| | | |
|---|---|---|
| WO | 2009/101861 A1 | 8/2009 |
| WO | 2013/054122 A2 | 4/2013 |

OTHER PUBLICATIONS

The Extended European Search Report for the corresponding European Patent Application No. 17176711.4 dated Nov. 14, 2017.

* cited by examiner

WIRELESS COMMUNICATION SYSTEM AND WIRELESS COMMUNICATION DEVICE

BACKGROUND

1. Technical Field

The present invention relates to a wireless communication system and a wireless communication device.

2. Related Art

In order to allow a wireless communication device to participate in a wireless LAN (Local Area Network), a connection setting for connecting the wireless communication device to a relay device (a device called a router or an access point) for relaying data to/from the wireless LAN is needed to be performed.

Here, there is known a wireless communication device including a communication unit that forms a temporal communication path for allowing the wireless communication device to perform wireless communication with another communication device without through a relay device, the communication unit being configured to, in order to allow the wireless communication device to communicate with the another communication device through the relay device, that is, in an infrastructure mode, allow connection setting information for connecting the another communication device to the relay device to be transmitted to the another communication device through the temporal communication path (refer to JP-A-2013-219430).

It is assumed a situation in which a certain wireless communication device attempts to transmit connection setting information needed for the above connection setting to another wireless communication device in accordance with a predetermined protocol (communication procedure).

In this case, unless the another wireless communication device supports the protocol, it is difficult for the another wireless communication device to obtain the connection setting information. For this reason, there is a room for further improvement in achieving the connection setting in the another wireless communication device.

SUMMARY

An advantage of some aspects of the invention is that a wireless communication system and a wireless communication device are provided that support a plurality of mutually different wireless connections and thereby enhance the convenience of users.

According to an aspect of the invention, a wireless communication system includes a first wireless communication device supporting a first wireless connection or a second wireless connection, and a second wireless communication device operating as an access point identified by network identification information including first identification information for use in the first wireless connection and second identification information for use in the second wireless connection, and the first wireless communication device is wirelessly connected to the second wireless communication device on the basis of the first identification information or the second identification information, both of which are included in the network identification information.

According to this configuration, the second wireless communication device operates as an access point identified by the network identification information, including the first identification information and the second identification information. Thus, when the first wireless communication device supports the first wireless connection, the first wireless communication device is capable of being wirelessly connected to the second wireless communication device on the basis of the first identification information, included in the network identification information. Further, when the first wireless communication device supports the second wireless connection, the first wireless communication device is capable of being wirelessly connected to the second wireless communication device on the basis of the second identification information, included in the network identification information. Accordingly, the configuration that allows the second wireless communication device to support a plurality of mutually different wireless connections enhances the convenience of users who utilize the wireless connection between the first wireless communication device and the second wireless communication device.

According to another aspect of the invention, the network identification information may be configured to allow the second identification information to be described in a free description portion of a description format for network identification information corresponding to the first wireless connection, and to allow the first identification information to be described in a free description portion of a description format for network identification information corresponding to the second wireless connection.

This configuration enables the network identification information of the second wireless communication device (access point) to practically have the roles of two kinds of network identification information.

According to another aspect of the invention, the first wireless communication device may be configured to transmit connection setting information for connecting the second wireless communication device to an external wireless relay device to the second wireless communication device through a wireless connection to the second wireless communication device, and the second wireless communication device may be configured to perform wireless communication with the first wireless communication device via the wireless relay device on the basis of the connection setting information, having been transmitted from the first wireless communication device.

This configuration facilitates the connection setting for connecting the second wireless communication device to the wireless relay device, through the use of the wireless connection between the first wireless communication device and the second wireless communication device, and as a result, the convenience of users is enhanced.

According to another aspect of the invention, the second wireless communication device may be configured to, when a connection to the wireless relay device is not set, operate as an access point identified by the network identification information, including the first identification information and the second identification information.

According to this configuration, the second wireless communication device temporarily behaves as the access point when the connection to the wireless relay device is not set, and as a result, the second wireless communication is capable of performing a connection setting for connecting the second wireless communication itself to the wireless relay device on the basis of the connection setting information having been received from the first wireless communication device.

There is a case where the first wireless communication device supports any one of the first wireless connection and the second wireless connection, whereas there is a case where the first wireless communication device supports both of the first wireless connection and the second wireless connection. Thus, in the case where the first wireless communication device supports the first wireless connection and the second wireless connection, the first wireless communication device may be configured such that the first wireless communication device performs a first search operation for searching the network identification information, including the first identification information, and in a case where the first wireless communication device detects one piece of the network identification information, including the first identification information, through the first search operation, the first wireless communication device is wirelessly connected to the second wireless communication device, identified by the network identification information having been detected, whereas in a case where the first wireless communication device detects a plurality of pieces of network identification information each including the first identification information through the first search operation, the first wireless communication device performs a second search operation for searching the network identification information, including the second identification information, and displays, on a predetermined display unit, a list of one or more pieces of network identification information each including the second identification information and having been detected through the second search operation.

This configuration enables the presentation of one specific process for a wireless connection of the first wireless communication device supporting both of the first wireless connection and the second wireless connection to the second wireless communication device.

Alternatively, in the case where the first wireless communication device supports the first wireless connection and the second wireless connection, the first wireless communication device may be configured to, when having detected the network identification information, including the first identification information and the second identification information, be wirelessly connected to the second wireless communication device, identified by the network identification information having been detected, through the first wireless connection or the second wireless connection, whichever is predetermined to be a connection having a relatively higher degree of security.

This configuration enables the presentation of one specific process for a further secure wireless connection of the first wireless communication device supporting both of the first wireless connection and the second wireless connection to the second wireless communication device.

The technical concept of the invention is achieved in categories other than the category of the wireless communication system. For example, it can be understood that the individual wireless communication devices constituting the wireless communication system are included within the scope of the invention. Further, it can be understood that the individual processes performed in the wireless communication system or performed by the individual wireless communication devices are methods included within the scope of the invention. Moreover, it can be understood that not only individual programs that allow hardware components (the wireless communication system and the individual wireless communication devices) to execute the individual methods, but also individual recording media storing therein the individual programs and being readable by computers are included within the scope of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described referring to the individual figures. Here, the individual figures are just exemplifications for use in the description of the embodiment.

1. OUTLINE DESCRIPTION OF SYSTEM

Figure 1:
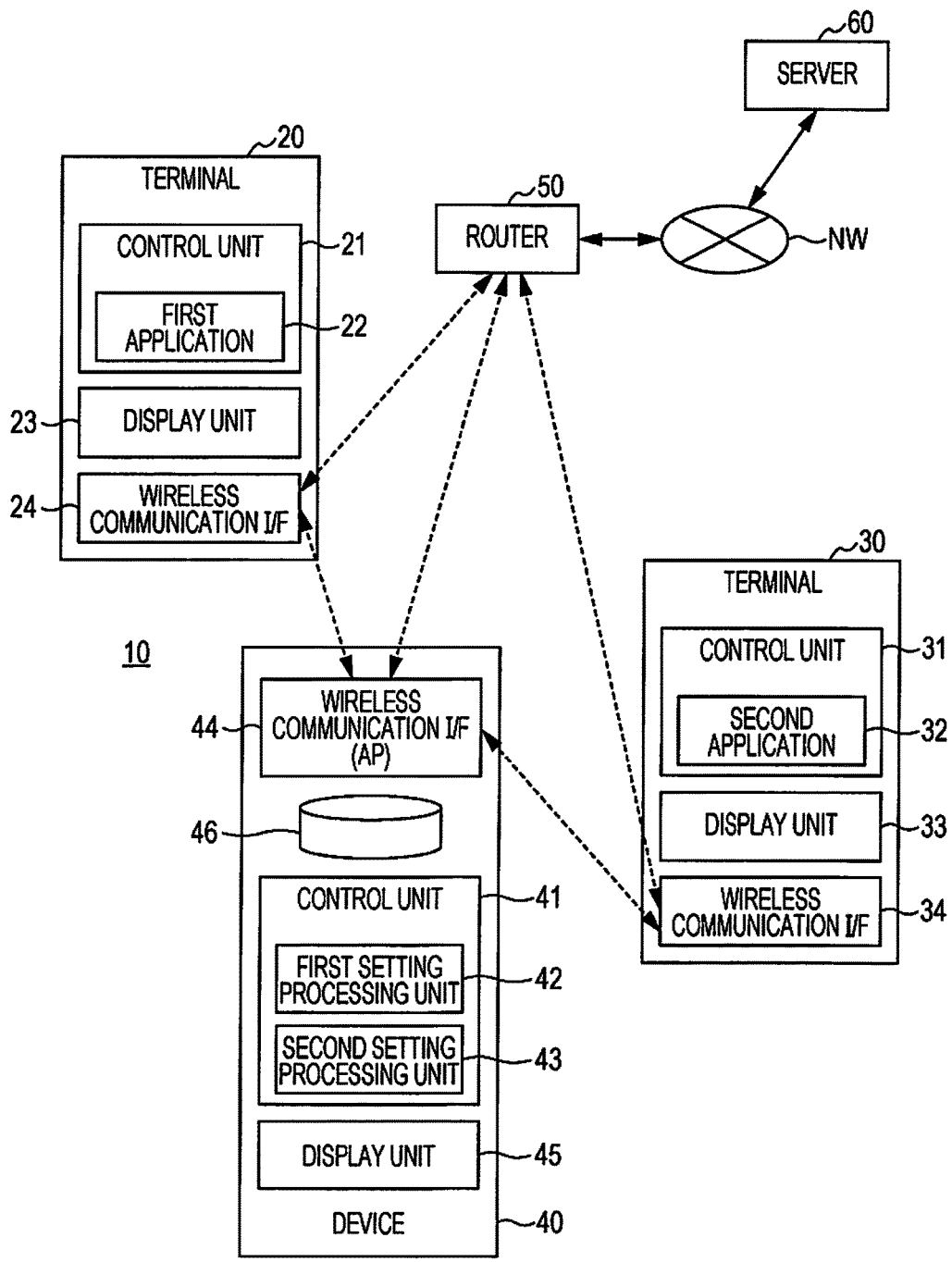
FIG. 1 is a diagram schematically illustrating a system configuration.

FIG. 1 schematically illustrates a system 10. This system 10 is a system according to this embodiment. For example, the system 10 includes a terminal 20 or a terminal 30, and further, includes a device 40. Each of the terminal 20, the terminal 30, and the device 40 is a wireless communication device having a wireless communication function for allowing itself to participate in a wireless LAN managed by a router 50. Here, the router 50 serves as a wireless relay device. Each of the terminals 20 and 30 corresponds to a specific example of the first wireless communication device, and the device 40 corresponds to a specific example of the second wireless communication device.

The router 50 connects the wireless LAN to an external network NW. The network NW encompasses the Internet. Each of the wireless communication devices (20, 30, and 40) is capable of connecting itself to a server 60 via the router 50. This server 60 exists on the network NW (for example, a cloud server). Here, at least part of the configuration of the system 10 will be referred to as a wireless communication system. The individual arrows of dashed lines shown in FIG. 1 indicate wireless connections among the wireless communication devices (20, 30, and 40) and the router 50, and the indicated wireless connections are wireless connections that are achieved in the present embodiment or have the potential of being achieved.

Each of the terminals 20 and 30 is constituted by a personal computer (PC), a smart-phone, a tablet-type terminal, a mobile-phone, or a terminal having the same performance as that of any one of the above devices. The terminal 20 includes a control unit 21, a display unit 23, a wireless communication interface (I/F) 24, and any other component. The control unit 21 is constituted by an IC including components, such as a CPU, a ROM, and a RAM, other storage media, and any other component. In the control unit 21, the CPU control the behavior of the terminal 20 in a way that allows arithmetic operation processing in accordance with programs stored in the ROM and any other storage medium to be performed using the RAM and any other storage medium as working areas. In the control unit 21, a first application 22 is installed, and this first application 22 serves as one kind of the programs.

The display unit 23 is a means for displaying visual information, and is constituted by, for example, a liquid crystal display (LCD), an organic EL display, or any other similar display. The display unit 23 may be configured to include a display and a driving circuit for driving the display. Naturally, the display unit 23 is capable of being served as a touch panel for receiving operations by a user.

The wireless communication I/F 24 achieves wireless communication conforming to, for example, a Wi-Fi scheme. The Wi-Fi scheme is a wireless communication scheme complying with a set of IEEE 802.11 specifications that is a set of specifications for the wireless LAN, and is certified by Wi-Fi Alliance. Further, the wireless communication I/F 24 may be configured to perform encryption and decryption of communication data.

The terminal 30 is constituted by a control unit 31, a display unit 33, a wireless communication I/F 34, and any other component. The basic configuration of the terminal 30 can be understood in a way that respectively allows the control unit 21, the display unit 23, the wireless communication I/F 24, and the first application 22 in the above description of the terminal 20 to be replaced by the control unit 31, the display unit 33, the wireless communication I/F 34, and a second application 32.

The first application 22 is a piece of application software that allows a wireless LAN connection setting in a setting target client to be achieved in accordance with a first setting protocol. The setting target client is a wireless communication device on which a wireless-LAN connection setting is performed in the present embodiment, and corresponds to the device 40 in FIG. 1. In this regard, however, the same function as that of the first application 22 may be achieved by one of expanded functions of an OS (Operating System) installed in the terminal 20. Meanwhile, the second application 32 is a piece of application software that allows a wireless LAN connection setting in the setting target client to be achieved in accordance with a second setting protocol different from the first setting protocol. The same function as that of the second application 32 may be achieved by one of expanded functions of an OS installed in the terminal 30.

The first setting protocol is, in summary, a protocol that allows a Wi-Fi connection to a setting target client operating as an access point (hereinafter referred to as an AP) to be made, and that allows data transfer of data needed for the wireless LAN setting in the setting target client to be performed using a predetermined protocol (for example, UDP (User Datagram Protocol)).

The second setting protocol is, in summary, a protocol that allows a Wi-Fi connection to the setting target client, operating as an AP, to be made, and that allows data transfer of data needed for the wireless LAN setting in the setting target client to be performed using a predetermined protocol (for example, HTTP (Hyper Text Transfer Protocol)) that is different from the aforementioned predetermined protocol.

Communication performed in accordance with the first setting protocol will be also referred to as a first wireless connection. Further, communication performed in accordance with the second setting protocol will be also referred to as a second wireless connection. Thus, each of the terminals 20 and 30 corresponds to the first wireless communication device supporting the first wireless connection or the second wireless connection. Specifically, the terminal 20 implements the first application 22 (or the same function as that of the first application 22), and thus, corresponds to the first wireless communication device supporting the first wireless connection. Further, the terminal 30 implements the second application 32 (or the same function as that of the second application 32), and thus, corresponds to the first wireless communication device supporting the second wireless connection.

In the present embodiment, it is assumed that, in each of the terminals 20 and 30, the setting of a connection to a wireless LAN managed by the router 50 is already performed. That is, each of the terminals 20 and 30 is already provided with connection setting information needed for connecting itself to the wireless LAN by means of an already known method, and is connected to the router 50 through Wi-Fi using the connection setting information. The connection setting information mentioned here is information including network identification information for identifying the router 50, and a password uniquely associated with the network identification information. The network identification information is, for example, an SSID (Service Set Identifier).

The device 40 may be, similarly to each of the terminals 20 and 30, a personal computer (PC), a smart-phone, a tablet-type terminal, a mobile-phone, or a terminal having the same performance as that of any one of the above devices, but, herein, the device 40 is assumed to be a device, such as a printer, a scanner, a multifunction device (a multifunction printer), or a digital still camera. The device 40 is configured to include a control unit 41, a wireless communication I/F 44, a display unit 45, and a storage unit 46, and any other component. The control unit 41 is constituted by an IC including components, such as a CPU, a ROM, and a RAM, other storage media, and any other component. In the control unit 41, the CPU controls the behavior of the device 40 in a way that allows arithmetic operation processing in accordance with programs stored in the ROM and any other storage medium to be performed using the RAM and any other storage medium as working areas. The control unit 41 includes, as part of its functions, a first setting processing unit 42 and a second setting processing unit 43. The first setting processing unit 42 performs processing based on data having been transmitted in accordance with the first setting protocol. Further, the second setting processing unit 43 performs processing based on data having been transmitted in accordance with the second setting protocol.

The display unit 45 is, similarly to the display units 23 and 33, a means for displaying visual information. The wireless communication I/F 44 is, similarly to the wireless communication I/Fs 24 and 34, a wireless communication interface capable of performing wireless communication in accordance with the Wi-Fi scheme. The storage unit 46 is constituted by a storage device, such as a hard disk drive or a flash memory, and part of the control unit 41.

It is needless to say that the configuration shown in FIG. 1 with respect to each of the wireless communication devices (20, 30, and 40) is just one portion of the configuration of the each of the wireless communication devices (20, 30, and 40). Each of the wireless communication devices (20, 30, and 40) has a publicly known configuration of a specific product corresponding to the each of the wireless communication devices (20, 30, and 40).

2. PROCESSING IN ACCORDANCE WITH FIRST SETTING PROTOCOL

Next, processing in accordance with the first setting protocol will be described. Here, it is assumed that the wireless LAN connection in the setting target client (the device 40) is in a state of being unset and the wireless communication I/F 44 of the device 40 is operating as an AP. In other words, when the wireless LAN connection to a wireless relay device, such as the router 50, is unset, the device 40 allows its state to enter a specific mode (an AP mode) in which the wireless communication I/F 44 operates as an AP.

In the AP mode, the wireless communication I/F 44 operates as an AP in wireless communication conforming to, for example, a Wi-Fi Direct scheme. The wireless communication I/F 44 includes network identification information for allowing a wireless LAN managed by the wireless communication I/F 44 itself serving as an AP to be identified. Similarly to the Wi-Fi scheme, the Wi-Fi Direct scheme is a wireless communication scheme complying with a set of IEEE 802.11 specifications, and is certified by Wi-Fi Alliance.

In the AP mode, the wireless communication I/F 44 operates as an AP identified by network identification information (SSID) including first identification information for use in the first wireless connection and second identification information for use in the second wireless connection. The SSID of the wireless communication I/F 44, operating as an AP in such a way as described above, will be also referred to as an SSID supporting a plurality of formats. The SSID supporting a plurality of formats serves as, at minimum, an SSID in a first format and an SSID in a second format.

The first format is an SSID format corresponding to the first wireless connection (i.e., an SSID format that is prescribed in advance so as to correspond to the first setting protocol). The SSID in the first format (hereinafter referred to as an SSID-1) is represented as follows.

SSID-1=AABBBBCCDDDDDDDDDD

The 1st and 2nd columns "AA" from the left end column of the SSID-1 correspond to an identification portion for use in identifying what is a setting protocol that the setting target client (AP) supports. Here, as an example, it is assumed that, when "P1" is described in the identification portion, this description shows that the setting target client (AP) supports the first setting protocol. Such identification information "P1", described in the identification portion, corresponds to an example of the first identification information for use in the first wireless connection.

The 3rd to 6th columns from the left end column of the SSID-1, that is, "BBBB", correspond to a device-type description portion in which information for use in identifying the device type of the setting target client is described on the basis of a specification. The 7th and 8th columns from the left end column of the SSID-1, that is, "CC", correspond to a state description in which information indicating the state of the setting target client is described on the basis of a specification. The 9th to 18th columns from the left end column of the SSID-1, that is, "DDDDDDDDDD", correspond to a free description portion in which any description in relation to the setting target client is allowed to be made within the scope of a specification.

The second format is an SSID format corresponding to the second wireless connection (i.e., an SSID format that is prescribed in advance so as to correspond to the second setting protocol). The SSID in the second format (hereinafter referred to as an SSID-2) is represented as follows.

SSID-2=DDDDDDDDDDAABBBBCC

The 8th and 7th columns from the right end column of the SSID-2, that is, "AA", correspond to the identification portion. Here, as an example, it is assumed that, when "P2" is described in the identification portion, this description shows that the setting target client (AP) supports the second setting protocol. Such identification information "P2", described in the identification portion, corresponds to an example of the second identification information for use in the second wireless connection.

The 6th to 3rd columns from the right end column of the SSID-2, that is, "BBBB", correspond to the device-type description portion. The 2nd and 1st columns from the right end column of the SSID-2, that is, "CC", correspond to the state description. The 18th to 9th columns from the right end column of the SSID-2, that is, "DDDDDDDDDD", correspond to the free description portion.

The wireless communication I/F 44 issues, for example, an SSID described below. This SSID is an SSID of the wireless communication I/F 44 operating as an AP, and will be referred to as an SSID-AP hereinafter.

SSID-AP=P112340000P2456700

When such an SSID-AP is seen as the SSID-1, identification information "P1" is described in the identification portion, and simultaneously "00P2456700" is described in the free description portion. Further, when the SSID-AP is seen as the SSID-2, identification information "P2" is described in the identification portion, and simultaneously "P112340000" is described in the free description portion. Accordingly, it can be said that such an SSID-AP is an SSID supporting a plurality of formats for both of the SSID-1 and the SSID-2. Further, the SSID-AP (the SSID supporting a plurality of formats) allows the second identification information (the identification information "P2") to be described in the free description portion of the first format, that is, the description format for network identification information corresponding to the first wireless connection, and simultaneously allows the first identification information (the identification information "P1") to be described in the free description portion of the second format, that is, the description format for network identification information corresponding to the second wireless connection.

Figure 2:
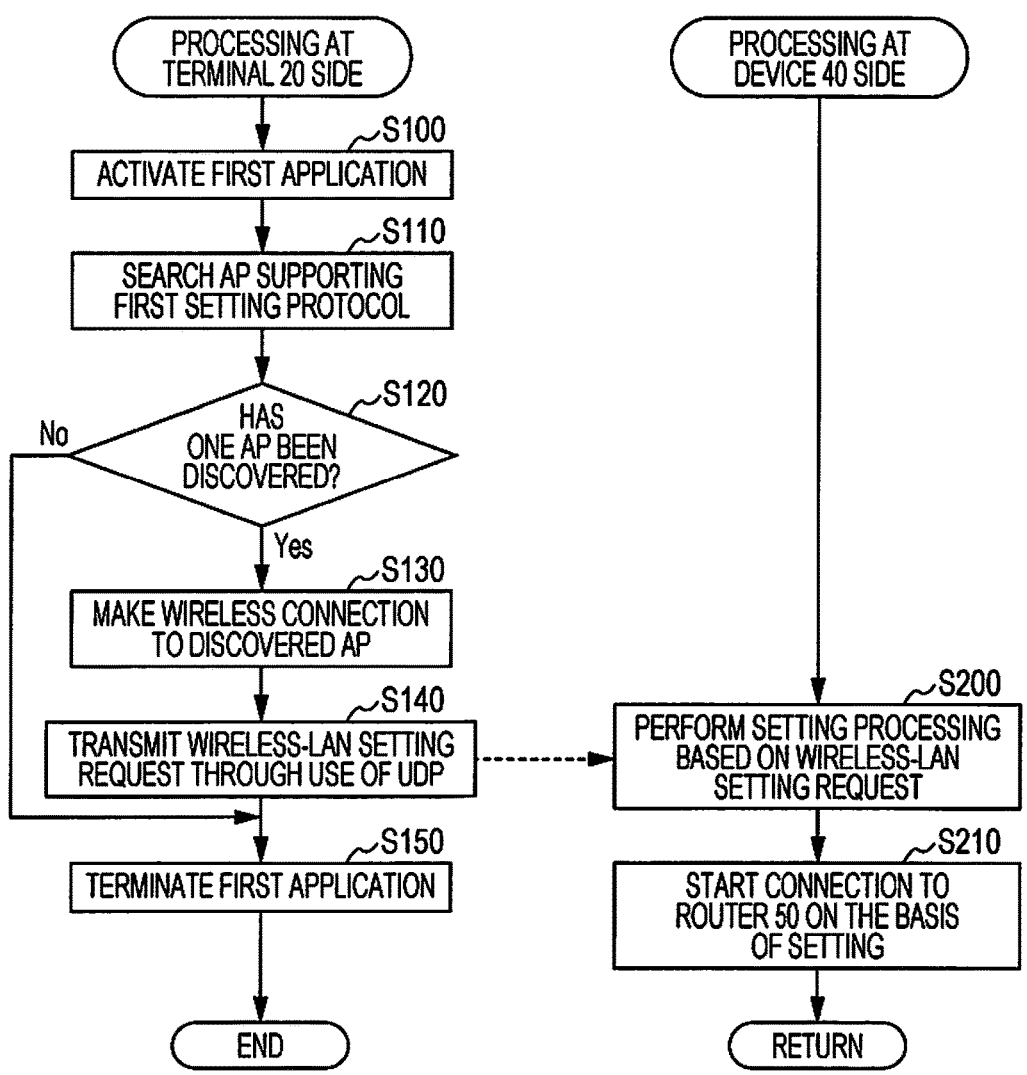
FIG. 2 is a flowchart illustrating processes in accordance with a first setting protocol.

FIG. 2 illustrates processes in accordance with the first setting protocol by way of a flowchart performed by the terminal 20 and a flowchart performed by the device 40. In step S100, the control unit 21 of the terminal 20 activates the first application 22. The control unit 21 may allow a Wi-Fi connection to the router 50 to be disconnected during the activation of the first application 22.

Next, the first application 22 (this means the control unit 21 executing the first application 22, and the same shall apply hereinafter) searches an AP supporting the first setting protocol (step S110). The first application 22 allows, for example, a predetermined search signal whose transmission destination is not specified to be transmitted from the wireless communication I/F 24. Upon reception of the search signal, a setting target client operating in an AP mode transmits the SSID of the setting target client itself, operating as an AP, as a response to the search signal. Upon reception of the SSID as a response to the search signal, the first application 22 determines whether or not the received SSID is the SSID of an AP supporting the first setting protocol. That is, when having regarded the received SSID as the SSID-1, in the case where the identification information "P1" is described in the identification portion of the SSID-1 (in the 1st and 2nd columns from the left end column of the received SSID), the first application 22 is capable of determining that the received SSID is the SSID of an AP supporting the first setting protocol.

As a result of the search, when having detected only one SSID of an AP supporting the first setting protocol, that is, when having discovered only one AP supporting the first setting protocol, the first application 22 determines "Yes" in step S120, and allows the process flow to proceed to step S130. In contrast, as a result of the search, when having not detected any SSID of an AP supporting the first setting protocol or having detected a plurality of SSIDs of APs each supporting the first setting protocol, (i.e., when having not discovered any AP supporting the first setting protocol or having discovered a plurality of APs each supporting the first setting protocol), the first application 22 determines "No" in step S120, and allows the process flow to skip steps S130 and S140 and proceed to step S150.

Here, as an example, it is assumed that the first application 22 is an application having been released by a certain device maker (for example, a printer maker) to users each having purchased a specific type of device (for example, a specific type of printer) to provide the users with the function of a wireless-LAN connection setting of the specific type of device. In this case, the first application 22 performs the wireless-LAN connection setting on one device (one setting target client) at one time. For this reason, the first application 22 is configured to, when having discovered only one AP supporting the first setting protocol in steps S110 and S120, allow the process flow to proceed to step S130.

In steps S110 and S120, the first application 22 may be configured to, in the limited case where only one AP supporting the first setting protocol and further corresponding to the specific type of device has been discovered, allow the process flow to proceed to step S130. When having regarded the received SSID, having been received as a response to the search signal, as the SSID-1, in the case where the identification information "P1" is described in the identification portion of the SSID-1 (in the 1st and 2nd columns from the left end column of the received SSID), and simultaneously, an already known device type number (model number) assigned to the specific type of device corresponding to the first application 22 is described in the device-type description portion of the SSID-1 (in the 3rd to 6th columns from the left end column of the received SSID), the first application 22 is capable of determining that the received SSID is the SSID of an AP supporting the first setting protocol and further corresponding to the specific type of device.

Here, it is assumed that the device 40 is the specific type of device corresponding to the first application 22. Further, as a premise of the description of step S130 and steps subsequent thereto, it is assumed that the first application 22 has determined that an SSID (SSID-AP) having been received, as a response to the search signal, from the wireless communication I/F 44 of the device 40 is the SSID of an AP supporting the first setting protocol and further corresponding to the specific type of device, and has discovered only such an AP (that is, has determined "Yes" in step S120).

In step S130, the first application 22 allows the wireless communication I/F 24 to make a wireless connection to the one AP having been discovered in such a way as described above (in step S130). That is, the wireless communication I/F 24 makes a connection through Wi-Fi to an AP (i.e., the wireless communication I/F 44 of the device 40) identified by the SSID-AP having been received as a response to the search signal. Thereafter, through the use of UDP, the first application 22 transmits a wireless-LAN setting request to the wireless communication I/F 44 via the wireless communication I/F 24 (step S140). The first application 22 allows the wireless-LAN setting request to include data needed for the wireless-LAN connection setting in the setting target client (the device 40), that is, connection setting information (an SSID for use in identifying the router 50 and a password associated with the SSID).

Further, the first application 22 appends a predetermined port number corresponding to UDP to the wireless-LAN setting request, and allows the wireless communication I/F 24 to transmit the wireless-LAN setting request (packets), having been generated in such a way as described above, to the wireless communication I/F 44. The SSID-AP of the AP (the wireless communication I/F 44), having been made a wireless-connection destination by the first application 22 through the above search, includes the first identification information (the identification information "P1"). Accordingly, it can be also said that the terminal 20 (the first wireless communication device) is wirelessly connected to the device 40 (the second wireless communication device) on the basis of the first identification information included in the network identification information.

After the transmission of the wireless-LAN setting request in step S140, the control unit 21 terminates the first application 22 (step S150). Through this process, the processing at the terminal 20 side (FIG. 2) is terminated. Here, when allowing the process flow to skip steps S130 and S140 to directly proceed from step S120 to step S150, the first application 22 may be terminated after having displayed, on the display unit 23, an error message for notifying a failure in the search of a setting target client or a failure in the wireless-LAN connection setting of a setting target client. Further, such a message may be output in the form of a speech signal from a speaker (not illustrated) included in the terminal 20.

At the device 40 side, wireless-LAN connection setting processing based on the received wireless-LAN setting request is performed (step S200). First, the wireless communication I/F 44 sorts the received wireless-LAN setting request to the first setting processing unit 42 or the second setting processing unit 43 on the basis of a port number appended to the received wireless-LAN setting request. In the case where the port number appended to the wireless-LAN setting request is a predetermined port number corresponding to UDP, the wireless-LAN setting request is sorted to the first setting processing unit 42.

The first setting processing unit 42 writes the connection setting information included in the wireless-LAN setting request, having been sorted by the wireless communication I/F 44, into a predetermined region of the storage unit 46. Through this process, the wireless-LAN connection setting has been completed in the device 40. Here, the device 40 may allow the control unit 41 to, during a period from the reception of the wireless-LAN setting request until the completion of the wireless-LAN connection setting based on the wireless-LAN setting request, display, on the display unit 45, a predetermined message for notifying that the wireless-LAN connection setting is currently under execution.

After the completion of the wireless-LAN connection setting, the wireless communication I/F 44 enters a Wi-Fi mode from the AP mode. The wireless communication I/F 44, having entered the Wi-Fi mode, is wirelessly connected to the router 50 on the basis of the connection setting information having been written into the predetermined region of the storage unit 46 (step S210). That is, the wireless communication I/F 44 terminates the operation as an AP, and is connected to the router 50 through Wi-Fi. As a result of this process, the device 40 becomes capable of performing wireless communication via the router 50 with any other wireless communication device (such as the terminal 20) participating in the wireless LAN managed by the router 50.

3. PROCESSING IN ACCORDANCE WITH SECOND SETTING PROTOCOL

Next, processing in accordance with the second setting protocol will be described. Here, it is also assumed that the wireless LAN connection in the setting target client (the device 40) is in a state of being unset, and the wireless communication I/F 44 of the device 40 is operating as an AP.

Figure 3:
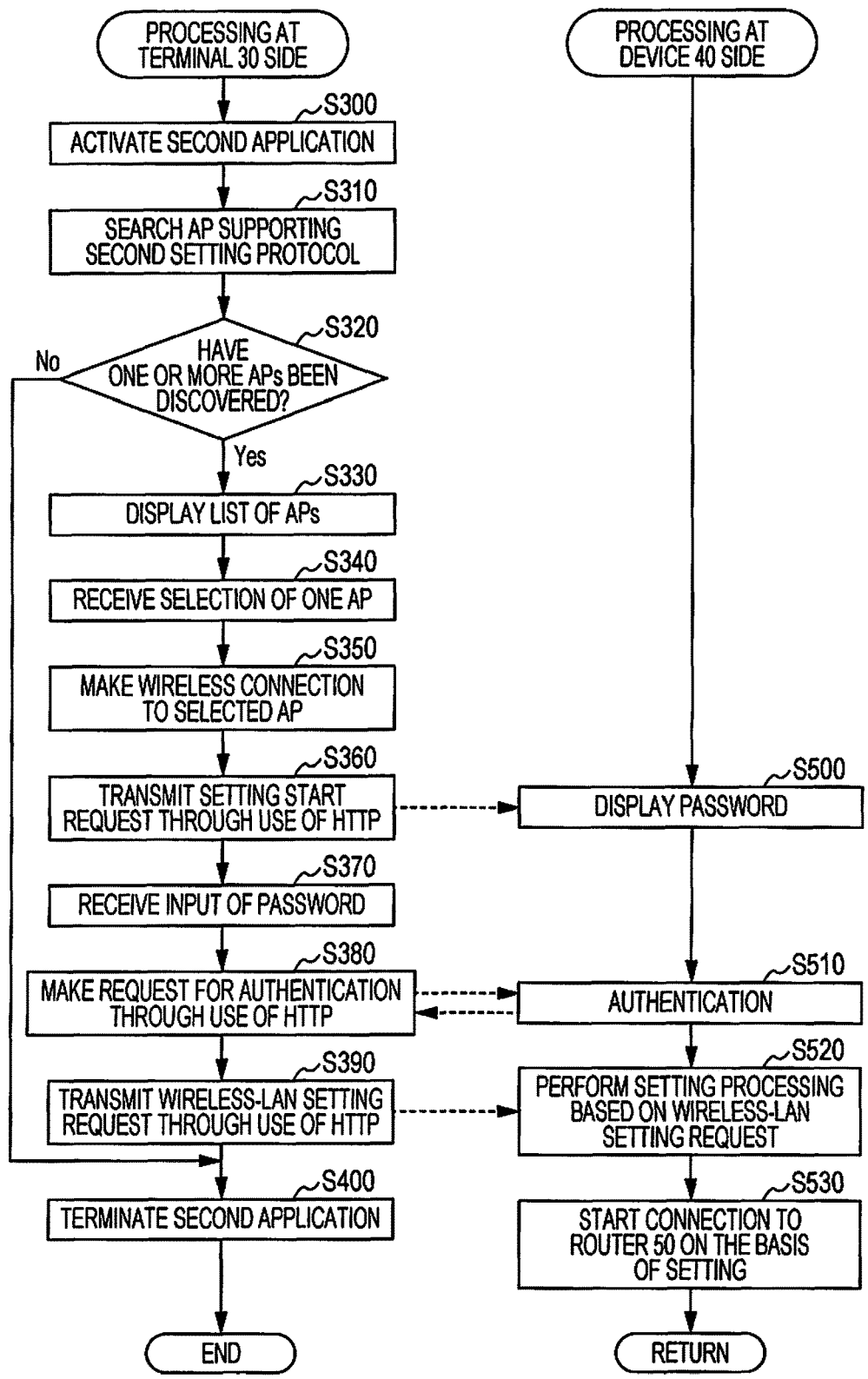
FIG. 3 is a flowchart illustrating processes in accordance with a second setting protocol.

FIG. 3 illustrates processes in accordance with the second setting protocol by way of a flowchart performed by the terminal 30 and a flowchart performed by the device 40.

In step S300, the control unit 31 of the terminal 30 activates the second application 32. The control unit 31 may allow a Wi-Fi connection to the router 50 to be disconnected during the activation of the second application 32.

Next, the second application 32 (this means the control unit 31 executing the second application 32, and the same shall apply hereinafter) searches an AP supporting the second setting protocol (step S310). The second application 32 allows, for example, a predetermined search signal whose transmission destination is not specified to be transmitted from the wireless communication I/F 34. Upon reception of the search signal, a setting target client operating in an AP mode transmits the SSID of the setting target client itself, operating as an AP, as a response to the search signal. Upon reception of the SSID as a response to the search signal, the second application 32 determines whether or not the received SSID is the SSID of an AP supporting the second setting protocol. That is, when having regarded the received SSID as the SSID-2, in the case where the identification information "P2" is described in the identification portion of the SSID-2 (in the 8th and 7th columns from the right end column of the received SSID), the second application 32 is capable of determining that the received SSID is the SSID of an AP supporting the second setting protocol.

As a result of the search, when having detected one or more SSIDs of APs each supporting the second setting protocol, that is, when having discovered one or more APs each supporting the second setting protocol, the second application 32 determines "Yes" in step S320, and allows the process flow to proceed to step S330. In contrast, as a result of the search, when having not discovered any SSID of an AP supporting the second setting protocol (i.e., when having not discovered any AP supporting the second setting protocol), the second application 32 determines "No" in step S320, and allows the process flow to skip steps S330 to S390 and proceed to step S400.

Here, as a premise of the description of step S330 and steps subsequent thereto, it is assumed that the second application 32 has determined that an SSID (SSID-AP) having been received, as a response to the search signal, from the wireless communication I/F 44 of the device 40 is the SSID of an AP supporting the second setting protocol, and has discovered such an AP (that is, has determined "Yes" in step S320).

In step S330, the second application 32 displays a list of the one or more APs having been discovered in such a way as described above on the display unit 33. For example, the second application 32 enumerates, for each of the one or more APs having been discovered in such a way as described above, not only an SSID, but also the name of a device type and any other attribute thin a range capable of being grasped. Further, the second application 32 receives the selection of one AP among the one or more APs contained in the list having been displayed (step S340). That is, a user operates input means (not illustrated), such as a touch panel, physical buttons, a mouse device, and/or a keyboard, while viewing the display unit 33 of the terminal 30 to select one AP that the user desires as a setting target client from among the one or more APs contained in the displayed list, and notifies the terminal 30 of the selected one AP. Here, it is assumed that the user has selected the device 40 from among the one or more APs contained in the displayed list.

The second application 32 allows the wireless communication I/F 34 to make a wireless connection to the one AP having been selected in such a way as described above (in step S350). That is, the wireless communication I/F 34 makes a connection through Wi-Fi to an AP identified by the SSID-AP (that is, a connection to the wireless communication I/F 44 of the device 40). Thereafter, through the use of HTTP, the second application 32 transmits a wireless-LAN setting start request to the wireless communication I/F 44 via the wireless communication I/F 34 (step S360). The second application 32 appends a predetermined port number corresponding to HTTP to data (packets) to be transmitted using HTTP.

At the device 40 side, the wireless communication I/F 44 sorts the wireless-LAN setting start request to the first setting processing unit 42 or the second setting processing unit 43 on the basis of a port number appended to the received wireless-LAN setting start request. Since the port number appended to the wireless-LAN setting start request is the predetermined port number corresponding to HTTP, the wireless-LAN setting start request is sorted to the second setting processing unit 43.

Upon acquisition of the wireless-LAN setting start request from the wireless communication I/F 44, the second setting processing unit 43 generates a password for authentication, and displays the generated password on the display unit 45 (step S500). The password for authentication, which is generated by the second setting processing unit 43 in step S500, is a password which is temporarily used and in which characters (such as numerals and/or alphabets) are arranged at random.

After having transmitted the wireless-LAN setting start request in step S360, the second application 32 receives the input of a password for authentication (step S370). That is, a user inputs the password for authentication having been displayed on the display unit 45 of the device 40 into the terminal 30 by operating input means (not illustrated) included in the terminal 30. Here, when, in a state of displaying the list of the one or more APs in step S330, the second application 32 has not received any selection of an AP during a period longer than or equal to a predetermined period of time, or when, after the transmission of the wireless-LAN setting start request in step S360, the second application 32 has not received any input of the password for authentication during a period longer than or equal to a predetermined period of time, the second application 32 may allow the process flow to skip subsequent processes and proceed to step S400.

In step S380, the second application 32 transmits an authentication request to the wireless communication I/F 44 via the wireless communication I/F 34 through the use of HTTP. The second application 32 allows the password for authentication, having been input in step S370, to be included in the authentication request.

At the device 40 side, the wireless communication I/F 44 sorts the received authentication request to the second setting processing unit 43 on the basis of a port number appended to the received authentication request. Upon reception of the authentication request from the wireless communication I/F 44, the second setting processing unit 43 compares the password for authentication included in the received authentication request with the password for authentication having been generated in step S500 to determine whether or not the above two kinds of passwords coincide with each other. Further, when the two kinds of passwords coincide with each other in the result of the comparison, the second setting processing unit 43 accepts the authentication request, that is, the second setting processing unit 43 determines that the authentication result is successful. In contrast, when the two kinds of passwords do not coincide with each other in the result of the comparison, the second setting processing unit 43 rejects the authentication request, that is, the second setting processing unit 43 determines that the authentication result is unsuccessful. The second setting processing unit 43 makes such a determination as to whether the authentication result is successful or unsuccessful, and transmits the determination result to the wireless communication I/F 34 of the terminal 30 as a response to the authentication request via the wireless communication I/F 44 (step S510).

Upon reception of the successful authentication result as a response to the authentication request, the second application 32 transmits a wireless-LAN setting request to the wireless communication I/F 44 via the wireless communication I/F 34 through the use of HTTP (step S390). The second application 32 allows data needed for the wireless-LAN connection setting in the setting target client (the device 40), that is, connection setting information (an SSID for identifying the router 50 and a password associated with the SSID) to be included in the wireless-LAN setting request. The SSID-AP of the AP (the wireless communication I/F 44), having been made a wireless-connection destination by the second application 32 through the above search, includes the second identification information (the identification information "P2"). Accordingly, it can be also said that the terminal 30 (the first wireless communication device) is wirelessly connected to the device 40 (the second wireless communication device) on the basis of the second identification information included in the network identification information. Meanwhile, upon reception of the unsuccessful authentication result as a response to the authentication request, the second application 32 allows the process flow to skip step S390 and proceed to step S400.

After the transmission of the wireless-LAN setting request in step S390, the control unit 31 terminates the second application 32 (step S400). With this termination of the second application 32, the processing at the terminal 30 side (FIG. 3) is terminated. When allowing the process flow to skip step S330 and steps subsequent thereto to directly proceed from step S320 to step S400, the application 32 may be terminated after having displayed, on the display unit 33, an error message for notifying a failure in the search of a setting target client or a failure in the wireless-LAN connection setting of a setting target client. Naturally, the second application 32 may be configured to, as described above, in the case of having not received the selection of an AP; in the case of having not received the input of the password for authentication; or in the case of having received the unsuccessful authentication result, display a predetermined error message corresponding to each of the above cases on the display unit 33, and then terminate the processing. Further, such a message may be output in the form of a speech signal from a speaker (not illustrated) included in the terminal 30.

At the device 40 side, wireless-LAN connection setting processing based on the received wireless-LAN setting request is performed (step S520). The wireless communication I/F 44 sorts the received wireless-LAN setting request to the second setting processing unit 43 on the basis of a port number appended to the received wireless-LAN setting request. The second setting processing unit 43 writes the connection setting information included in the wireless-LAN setting request, having been sorted by the wireless communication I/F 44, into a predetermined region of the storage unit 46. Through this process, the wireless-LAN connection setting has been completed in the device 40. As described above, the device 40 may be configured to, during a period from the reception of the wireless-LAN setting request until the completion of the wireless-LAN connection setting based on the wireless-LAN setting request, allow the control unit 41 to display, on the display unit 45, a predetermined message for notifying that the wireless-LAN connection setting is currently under execution.

After the completion of the wireless-LAN connection setting, the wireless communication I/F 44 enters a Wi-Fi mode from the AP mode. The wireless communication I/F 44, having entered the Wi-Fi mode, is wirelessly connected to the router 50 on the basis of the connection setting information having been written into the predetermined region of the storage unit 46 (step S530). That is, the wireless communication I/F 44 terminates the operation as an AP, and then is connected to the router 50 through Wi-Fi. As a result of this processes, the device 40 becomes capable of performing wireless communication via the router 50 with any other wireless communication device (such as the terminal 30) participating in the wireless LAN managed by the router 50.

4. CONCLUSION

According to the present embodiment, the wireless communication system includes a first wireless communication device (at least any one of the terminals 20 and 30) supporting a first wireless connection or a second wireless connection, and a second wireless communication device (the device 40) operating as an AP identified by network identification information including first identification information for use in the first wireless connection and second identification information for use in the second wireless connection (for example, the SSID-AP including the identification information "P1" and the identification information "P2"). Further, the first wireless communication device is wirelessly connected to the second wireless communication device on the basis of the first identification information or the second identification information, both of which are included in the network identification information (the SSID-AP). That is, in the case of the first wireless communication device supporting the first wireless connection (that is, in the case of the terminal 20 implementing the first application 22), the first wireless communication device is capable of recognizing the device 40 as an AP that is a connection destination supporting the first setting protocol and of being wirelessly connected to the device 40, on the basis of the first identification information (the identification information "P1") included in the SSID-AP of the device 40. Further, in the case of the second wireless communication device supporting the second wireless connection (that is, in the case of the terminal 30 implementing the second application 32), the first wireless communication device is capable of recognizing the device 40 as an AP that is a connection destination supporting the second setting protocol and of being wirelessly connected to the device 40, on the basis of the second identification information (the identification information "P2") included in the SSID-AP of the device 40. In this way, the second wireless communication device (the device 40) is allowed to support a plurality of mutually different wireless connections, and this configuration enhances the convenience of users who utilize the wireless connection between the first wireless communication device and the second wireless communication device.

Further, according to the present embodiment, in the SSID-AP of the device 40 operating as an AP, the second identification information (the identification information "P2") is described in the free description portion of the description format of an SSID corresponding to the first wireless connection (i.e., in the free description portion of the first format), and the first identification information (the identification information "P1") is described in the free description portion of the description format of an SSID corresponding to the second wireless connection (i.e., in the free description portion of the second format). That is, the SSID-AP of the device 40 operating as an AP is allowed to practically have the roles of two kinds of network identification information. With this configuration, in the case of the first wireless communication device supporting the first wireless connection (that is, in the case of the terminal 20 implementing the first application 22), the SSID-AP of the device 40 is regarded as the SSID-1, and without being affected by the free description portion of the SSID-1 (the portion in which the second identification information is described), the device 40 is recognized as an AP supporting the first setting protocol on the basis of the first identification information included in the SSID-1. Further, in the case of the first wireless communication device supporting the second wireless connection (that is, in the case of the terminal 30 implementing the second application 32), the SSID-AP of the device 40 is regarded as the SSID-2, and without being affected by the free description portion of the SSID-2 (the portion in which the first identification information is described), the device 40 is recognized as an AP supporting the second setting protocol on the basis of the second identification information included in the SSID-2.

Further, according to the present embodiment, the first wireless communication device transmits connection setting information for connecting the second wireless communication device to an external wireless relay device (the router 50) to the second wireless communication device through a wireless connection to the second wireless communication device, and the second wireless communication device performs wireless communication with the first wireless communication device via the router 50 on the basis of the connection setting information having been transmitted from the first wireless communication device. That is, if a user has any one of the first wireless communication device supporting the first wireless connection (i.e., the terminal 20) and the first wireless communication device supporting the second wireless connection (i.e., the terminal 30), the user is able to, through the use of the wireless connection between the first wireless communication device and the second wireless communication device, allow the second wireless communication device to perform wireless-LAN connection setting for connecting the second wireless communication itself to the router 50, and as a result, this configuration enhances the convenience of the user.

Further, according to the present embodiment, the second wireless communication device is configured to, when the connection to a wireless relay device (the router 50) is not set, enter the AP mode to operate as an AP identified by the network identification information (the SSID-AP) including the first identification information and the second identification information. With this configuration, the second wireless communication device in which the connection to the router 50 is not set temporarily behaves as an AP, and thereby, is capable of easily and surely performing the wireless-LAN connection setting for connecting the second wireless communication device itself to the router 50 on the basis of the connection setting information received from the first wireless communication device.

5. MODIFICATION EXAMPLES

The invention is not limited to the embodiment having been described so far, and, for example, individual modification examples described below may be employed as embodiments of the invention.

There is a case where, as described above, the first wireless communication device supports any one of the first wireless connection and the second wireless connection, whereas there is a case where the first wireless communication device supports both of the first wireless connection and the second wireless connection. For example, it is assumed that the control unit 21 of the terminal 20 implements the first application 22 and the second application 32. In this case, first, the control unit 21 of the terminal 20 performs steps S100 to S120 (FIG. 2). Further, when the determination in step S120 is "No", in the case where a plurality of APs each supporting the first setting protocol have been discovered, the processes in step S300 and steps subsequent thereto (FIG. 3) are performed after the termination of the first application 22 in step S150.

That is, in the case where the first wireless communication device (for example, the terminal 20) supports the first wireless connection and the second wireless connection, the first wireless communication device performs a first search operation for searching the network identification information, including the first identification information (step S110), and when having detected one piece of the network identification information, including the first identification information, through the first search operation ("Yes" in step S120), the first wireless communication device is wirelessly connected to the second wireless communication device (the device 40) identified by the network identification information (the SSID-AP), having been detected (steps S130 and S140). In contrast, when having detected a plurality of pieces of network identification information each including the first identification information through the first search operation ("No" in step S120), the first wireless communication device (the terminal 20) performs a second search operation for searching the network identification information, including the second identification information (step S310), and displays, on the predetermined display unit 23, a list of one or more pieces of network identification information each including the second identification information and having been detected through the second search operation (step S330). This configuration enables the presentation of one specific process of a wireless connecting of the first wireless communication device supporting both of the first wireless connection and the second wireless connection to the second wireless communication device. Moreover, the above configuration finally increases the probability of succeeding in the wireless-LAN connection setting for connecting to the router 50 in the second wireless communication device (the device 40).

Alternatively, in the case where the first wireless communication device supports the first wireless connection and the second wireless connection, when having detected the network identification information, including the first identification information and the second identification information, the first wireless communication device may be wirelessly connected to the second wireless communication device, identified by the network identification information having been detected, through the first wireless connection or the second wireless connection, whichever is predetermined to be a connection having a relatively higher degree of security.

For example, it is assumed again the case where the control unit 21 of the terminal 20 implements the first application 22 and the second application 32. In this case, when the control unit 21 of the terminal 20 has performed the processes in steps S100 to S120 (FIG. 2) and has determined "Yes" in step S120, the control unit 21 regards the SSID of one discovered AP as the SSID-2, and further determines whether or not the identification information "P2" is described in the identification portion (the 8th and 7th columns from the right end column of the SSID). Further, in the case where the identification information "P2" is described in the identification portion (the 8th and 7th columns from the right end column of the SSID), the control unit 21 is capable of determining that the SSID of the one discovered AP is network identification information including the first identification information and the second identification information. When having discovered such network identification information including the first identification information and the second identification information, the control unit 21 does not perform the processes in steps S130 and S140, that is, does not make the first wireless connection to an AP identified by the network identification information (i.e., the device 40), and, instead of the first wireless connection, makes the second wireless connection (steps S350 to S390) having higher security intensity. This configuration enables the presentation of one specific process of a further secure wireless connection of the first wireless communication device supporting both of the first wireless connection and the second wireless connection to the second wireless communication device.

Such protocols UDP and HTTP having been cited so far are merely examples. In the present embodiment, instead of these protocols, other protocols, such as TCP (Transmission Control Protocol), may be employed in the data transfer needed for the wireless-LAN connection setting in a setting target client.

The entire disclosure of Japanese Patent Application No. 2016-134414, filed Jul. 6, 2016 is expressly incorporated by reference herein.

What is claimed is:
1. A wireless communication system comprising:
a first wireless communication device supporting a first wireless connection in accordance with a first setting protocol or a second wireless connection in accordance with a second setting protocol, with the first setting protocol being different from the second setting protocol; and
a second wireless communication device operating as an access point identified by network identification information including first identification information for use in the first wireless connection and second identification information for use in the second wireless connection, the first identification information being a character string corresponding to the first setting protocol, the second identification information being a character string corresponding to the second setting protocol,
wherein the first wireless communication device is wirelessly connected to the second wireless communication device on a basis of the first identification information or the second identification information, both of which are included in the network identification information, and
wherein the second wireless communication device transmitting the network identification information with both the character string corresponding to the first setting protocol and the character string corresponding to the second setting protocol.

2. The wireless communication system according to claim 1, wherein the network identification information allows the second identification information to be described in a free description portion of a description format for network identification information corresponding to the first wireless connection, and allows the first identification information to be described in a free description portion of a description format for network identification information corresponding to the second wireless connection.

3. The wireless communication system according to claim 1,
wherein the first wireless communication device transmits connection setting information for connecting the second wireless communication device to an external wireless relay device to the second wireless communication device through a wireless connection to the second wireless communication device, and
wherein the second wireless communication device performs wireless communication with the first wireless communication device via the wireless relay device on a basis of the connection setting information, having been transmitted from the first wireless communication device.

4. The wireless communication system according to claim 3, wherein the second wireless communication device is configured to, when a connection to the wireless relay device is not set, operate as an access point identified by the network identification information, including the first identification information and the second identification information.

5. A wireless communication system comprising:
a first wireless communication device supporting a first wireless connection or a second wireless connection; and
a second wireless communication device operating as an access point identified by network identification information including first identification information for use in the first wireless connection and second identification information for use in the second wireless connection,
wherein the first wireless communication device is wirelessly connected to the second wireless communication device on a basis of the first identification information or the second identification information, both of which are included in the network identification information, and
wherein in a case where the first wireless communication device supports the first wireless connection and the second wireless connection, the first wireless communication device is configured such that the first wireless communication device performs a first search operation for searching the network identification information, including the first identification information, and in a case where the first wireless communication device detects one piece of the network identification information, including the first identification information, through the first search operation, the first wireless communication device is wirelessly connected to the second wireless communication device, identified by the network identification information having been detected, whereas in a case where the first wireless communication device detects a plurality of pieces of network identification information each including the first identification information through the first search operation, the first wireless communication device performs a second search operation for searching the network identification information, including the second identification information, and displays, on a predetermined display unit, a list of one or more pieces of network identification information each including the second identification information and having been detected through the second search operation.

6. The wireless communication system according to claim 1, wherein in a case where the first wireless communication device supports the first wireless connection and the second wireless connection, the first wireless communication device is configured to, when having detected the network identification information, including the first identification information and the second identification information, be wirelessly connected to the second wireless communication device, identified by the network identification information having been detected, through the first wireless connection or the second wireless connection, whichever is predetermined to be a connection having a relatively higher degree of security.

7. A wireless communication device comprising:
a controller; and
a wireless communication interface configured to operate as an access point identified by network identification information including first identification information for use in a first wireless connection in accordance with a first setting protocol and second identification information for use in a second wireless connection in accordance with a second setting protocol, with the first setting protocol being different from the second setting protocol, the first identification information being a character string corresponding to the first setting protocol, the second identification information being a character string corresponding to the second setting protocol, and the wireless communication interface being configured to transmit the network identification information with both the character string corresponding to the first setting protocol and the character string corresponding to the second setting protocol.

8. The wireless communication device according to claim 7, wherein the network identification information allows the second identification information to be described in a free description portion of a description format for network identification information corresponding to the first wireless connection, and allows the first identification information to be described in a free description portion of a description format for network identification information corresponding to the second wireless connection.

9. The wireless communication device according to claim 7, wherein the wireless communication device receives connection setting information for connecting the second wireless communication device to an external wireless relay device through a wireless connection, and wherein the wireless communication device performs wireless communication with the first wireless communication device via the wireless relay device on a basis of the received connection setting information.

10. The wireless communication device according to claim 9, wherein the wireless communication device is configured to, when a connection to the wireless relay device is not set, operate as an access point identified by the network identification information, including the first identification information and the second identification information.

* * * * *